(12) United States Patent
Askan

(10) Patent No.: US 11,217,985 B2
(45) Date of Patent: Jan. 4, 2022

(54) LOW-VOLTAGE CIRCUIT BREAKER DEVICE

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 8 days.

(21) Appl. No.: 16/650,487

(22) PCT Filed: Sep. 25, 2018

(86) PCT No.: PCT/EP2018/075853
§ 371 (c)(1),
(2) Date: Mar. 25, 2020

(87) PCT Pub. No.: WO2019/063500
PCT Pub. Date: Apr. 4, 2019

(65) Prior Publication Data
US 2021/0203149 A1    Jul. 1, 2021

(30) Foreign Application Priority Data
Sep. 26, 2017 (DE) .................. 10 2017 122 218.9

(51) Int. Cl.
*H02H 3/00* (2006.01)
*H02H 3/08* (2006.01)
*H02H 1/00* (2006.01)

(52) U.S. Cl.
CPC ............ *H02H 3/08* (2013.01); *H02H 1/0007* (2013.01)

(58) Field of Classification Search
CPC .............................. H02H 3/08; H02H 1/0007
(Continued)

(56) References Cited

U.S. PATENT DOCUMENTS

| 4,636,907 A | 1/1987 | Howell |
| 7,508,636 B2 * | 3/2009 | Sellier .................... H01H 3/222 361/2 |

(Continued)

FOREIGN PATENT DOCUMENTS

| DE | 3622098 A1 | 1/1987 |
| DE | 4142569 A1 | 6/1993 |

(Continued)

*Primary Examiner* — Jared Fureman
*Assistant Examiner* — Lucy M Thomas
(74) *Attorney, Agent, or Firm* — Leydig, Voit & Mayer, Ltd.

(57) ABSTRACT

A low-voltage circuit breaker device includes: at least one line conductor path from a line conductor supply connection of the low-voltage circuit breaker device to a line conductor load connection of the low-voltage circuit breaker device; a neutral conductor path from a neutral conductor connection of the low-voltage circuit breaker device to a neutral conductor load connection of the low-voltage circuit breaker device; a mechanical bypass switch arranged in the line conductor path; a first semiconductor circuit assembly of the low-voltage circuit breaker device being connected in parallel with the mechanical bypass switch; an electronic control unit for actuating the mechanical bypass switch and the first semiconductor circuit assembly; an ammeter assembly arranged in the line conductor path, which ammeter assembly is connected to the electronic control unit; and a second semiconductor circuit assembly arranged in the line conductor path.

9 Claims, 1 Drawing Sheet

(58) Field of Classification Search
USPC .......................................................... 361/101
See application file for complete search history.

(56) References Cited

U.S. PATENT DOCUMENTS

| | | | |
|---|---|---|---|
| 9,742,185 B2* | 8/2017 | Wang | ..................... H02H 3/087 |
| 2005/0146814 A1 | 7/2005 | Besrest et al. | |
| 2012/0007657 A1* | 1/2012 | Naumann | ............... H01H 9/542 |
| | | | 327/434 |
| 2012/0299393 A1* | 11/2012 | Hafner | ................... H01H 9/542 |
| | | | 307/113 |
| 2016/0322809 A1 | 11/2016 | Prabhakaran et al. | |
| 2020/0058454 A1 | 2/2020 | Askan | |

FOREIGN PATENT DOCUMENTS

| | | |
|---|---|---|
| DE | 60303773 T2 | 9/2006 |
| EP | 2320535 A1 | 5/2011 |
| JP | 2006092859 A | 4/2006 |
| WO | WO 2015028634 A1 | 3/2015 |
| WO | WO 2018072983 A1 | 4/2018 |

* cited by examiner

LOW-VOLTAGE CIRCUIT BREAKER DEVICE

CROSS-REFERENCE TO PRIOR APPLICATIONS

This application is a U.S. National Phase application under 35 U.S.C. § 371 of International Application No. PCT/EP2018/075853, filed on Sep. 25, 2018, and claims benefit to German Patent Application No. DE 10 2017 122 218.9, filed on Sep. 26, 2017. The International Application was published in German on Apr. 4, 2019 as WO/2019/063500 under PCT Article 21(2).

FIELD

The invention relates to a low-voltage circuit breaker device.

BACKGROUND

A corresponding circuit breaker device is known from WO 2015/028634 A1, by the applicant. The semiconductor switch of a circuit breaker device of this kind is used merely for regularly switching on and off the relevant circuit breaker device, as well as for emergency tripping in the event of a short circuit or an excess current. Both regular activation of a circuit breaker device and emergency tripping occur extremely rarely. It is true that, sometimes, higher currents than the rated current flow across a circuit breaker device, but, provided they are small enough or last only briefly, excess currents of this kind do not lead to tripping of the relevant circuit breaker.

However, excess currents of this kind do not flow across the bypass relay of a corresponding hybrid circuit breaker. A bypass relay of this kind has to open far more quickly than a conventional relay, and therefore special contacts and a special design are required. This results in a certain, no longer negligible, resistance of the bypass relay. Said resistance increases significantly again in the case of a bypass relay comprising a plurality of series contact points. Although this resistance is not a problem in normal operation, in the case of an overload, without triggering the circuit breaker, this leads to problematic thermal stress of the bypass relay, as well as the adjacent assemblies within the circuit breaker. This can reduce the service life of the circuit breaker.

SUMMARY

In an embodiment, the present invention provides a low-voltage circuit breaker device, comprising: at least one line conductor path from a line conductor supply connection of the low-voltage circuit breaker device to a line conductor load connection of the low-voltage circuit breaker device; a neutral conductor path from a neutral conductor connection of the low-voltage circuit breaker device to a neutral conductor load connection of the low-voltage circuit breaker device; a mechanical bypass switch arranged in the line conductor path; a first semiconductor circuit assembly of the low-voltage circuit breaker device being connected in parallel with the mechanical bypass switch; an electronic control unit configured to actuate the mechanical bypass switch and the first semiconductor circuit assembly; an ammeter assembly arranged in the line conductor path, which ammeter assembly is connected to the electronic control unit; and a second semiconductor circuit assembly arranged in the line conductor path so as to be in series with the mechanical bypass switch and in parallel with the first semiconductor circuit assembly, in terms of circuit technology, wherein the electronic control unit is configured such that: in event of a current arising over the line conductor path that is greater than a rated current but smaller than a trigger excess current comprising a short circuit, the electronic control unit initially completes the first semiconductor circuit assembly, then cuts off the second semiconductor circuit assembly, and subsequently connects the first semiconductor circuit assembly and the second semiconductor circuit assembly in a specifiably alternating manner, and thereby conducts a current flow in an alternating manner via the first semiconductor circuit assembly and the second semiconductor circuit assembly, and/or in event of a trigger excess current comprising a short circuit, arising over the line conductor path, the electronic control unit initially completes the first semiconductor circuit assembly, subsequently cuts off the second semiconductor circuit assembly, subsequently opens the mechanical bypass switch, and subsequently controls the first semiconductor circuit assembly so as to enter a nonconductive state.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a circuit breaker device of the type mentioned at the outset, by means of which the mentioned disadvantages can be prevented, which has a small installation size, which allows for high nominal or permanent currents, which has a high tripping capacity, and exhibits a high degree of reliability over a long time.

As a result, even at high permanent currents or excess currents which do not lead to tripping, the self-heating of the circuit breaker device can be kept low. The low heating also makes it possible to keep the installation size of the circuit breaker device small. Owing to the low self-heating of the circuit breaker device, the inside temperatures can be kept low, as a result of which the service life of the semiconductors in the circuit breaker device, and the reliability, are increased.

Figure 2:
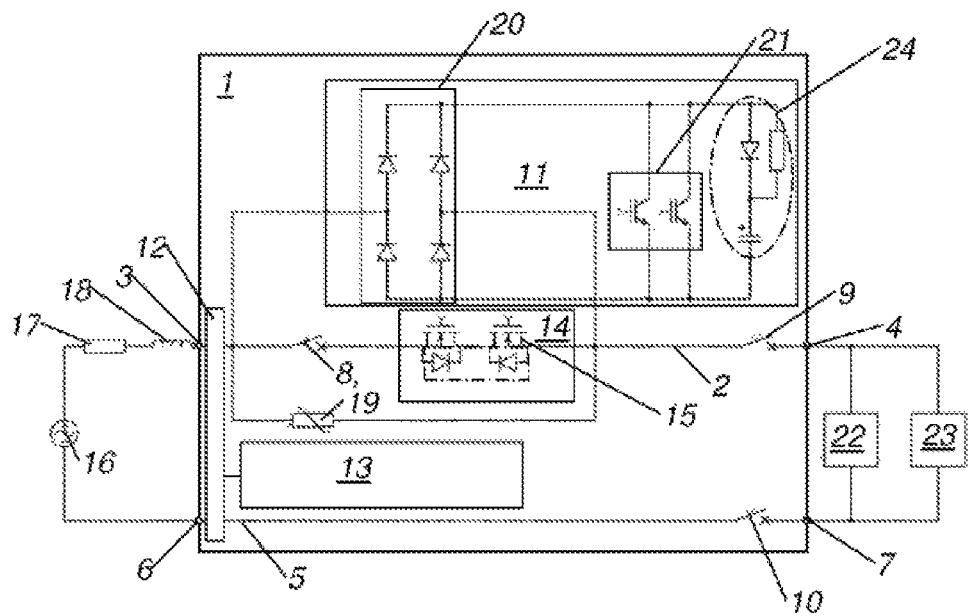
FIG. 2 shows an embodiment of a circuit breaker device comprising a second embodiment of a switching path.

FIG. 2 is a block diagram of a preferred embodiment of a low-voltage circuit breaker device 1 comprising at least one line conductor path 2 from a line conductor supply connection 3 of the low-voltage circuit breaker device 1 to a line conductor load connection 4 of the low-voltage circuit breaker device 1, and a neutral conductor path 5 from a neutral conductor connection 6 of the low-voltage circuit breaker device 1 to a neutral conductor load connection 7 of the low-voltage circuit breaker device 1, a mechanical bypass switch 8 being arranged in the line conductor path 2, a first semiconductor circuit assembly 11 of the low-voltage circuit breaker device 1 being connected in parallel with the bypass switch 8, an ammeter assembly 12 being arranged in the line conductor path 2, which ammeter assembly is connected to an electronic control unit 13 of the circuit breaker device 1, the electronic control unit 13 being designed to actuate the bypass switch 8 and the first semiconductor circuit assembly 11, a second semiconductor circuit assembly 14 being arranged in the line conductor path 2 so as to be in series with the bypass switch 8 and in parallel with the first semiconductor circuit assembly 11, in terms of circuit technology, and the electronic control unit 13 being designed such that:

- in the event of a current arising over the line conductor path 2 that is greater than the rated current but smaller than the trigger excess current, in particular a short circuit, said control unit initially activates the first semiconductor circuit assembly 11, then cuts off the second semiconductor circuit assembly 14, and subsequently connects the first semiconductor circuit assembly 11 and the second semiconductor circuit assembly 14 in a specifiably alternating manner, and thereby conducts the current flow in an alternating manner via the first semiconductor circuit assembly 11 and the second semiconductor circuit assembly 14, and/or such that

- in the event of a trigger excess current, in particular a short circuit, arising over the line conductor path 2, said control unit initially activates the first semiconductor circuit assembly 11, subsequently cuts off the second semiconductor circuit assembly 14, subsequently opens the bypass switch 8, and subsequently controls the first semiconductor circuit assembly 11 so as to enter the non-conductive state.

As a result, even at high permanent currents or excess currents which do not lead to tripping, the self-heating of the circuit breaker device 1 can be kept low. The low heating also makes it possible to keep the installation size of the circuit breaker device 1 small. Owing to the low self-heating of the circuit breaker device 1, the inside temperatures can be kept low, as a result of which the service life of the semiconductors in the circuit breaker device 1, and the reliability, are increased.

The present low-voltage circuit breaker device 1, as well as the circuit breaker device according to WO 2015/028634 A1, are low-voltage circuit breaker devices. Low-voltage designates, as is conventional, the range up to 1000 V AC voltage or 1500 V DC voltage.

The circuit breaker device 1 according to FIG. 2 comprises a line conductor path 2 and a neutral conductor path 5. The line conductor path 2 extends through the circuit breaker device 1 from a line conductor supply connection 3 to a line conductor load connection 4. The neutral conductor path 5 extends through the circuit breaker device 1 from a neutral conductor connection 6 to a neutral conductor load connection 7. The relevant connections 3, 4, 6, 7 are in each case preferably formed as screw terminals or plug-in terminals, and are arranged in the circuit breaker device 1 so as to be accessible from the outside.

The circuit breaker device 1 preferably comprises an insulation material housing.

A mechanical bypass switch 8, preferably having a simple contact interruption means, is arranged in the line conductor path 2. In the case of the circuit breaker according to FIG. 2, a first mechanical disconnector 9 is furthermore arranged in the line conductor path 2 so as to be in series with the bypass switch 8. A second mechanical disconnector 10 is arranged in the neutral conductor path 5. A semiconductor circuit assembly 11 is connected in parallel with the bypass switch 8.

Furthermore, a surge arrestor 19 is connected in parallel with the bypass switch 8.

The circuit breaker device 1 furthermore comprises an ammeter assembly 12 which is arranged at least in the line conductor path 2 and which is preferably formed having a shunt resistor.

The ammeter assembly 12 is connected to an electronic control unit 13 of the circuit breaker device 1 which is preferably formed comprising a microcontroller or microprocessor. The electronic control unit 13 is designed to actuate the bypass switch 8 and the first semiconductor circuit assembly 11, as well as the first mechanical disconnector 9 and the second mechanical disconnector 10, and therefore to actuate or switch said components in a specifiable manner. For this purpose, the electronic control unit 13 is connected, preferably in terms of circuit technology, to the first semiconductor circuit assembly 11, as well as furthermore to in particular electromagnetic actuation elements of the mechanical switches, i.e. of the bypass switch 8, the first mechanical disconnector 9 and the second mechanical disconnector 10. The corresponding connections proceeding from the electronic control unit 13 are not shown in FIG. 2. The electronic control unit 13 is furthermore not shown at all in FIG. 1.

The first semiconductor circuit assembly 11 can be designed as any type or embodiment or topology of a bidirectional 4Q (four quadrant) switch.

In this respect, FIG. 2 shows merely a possible embodiment of the first semiconductor circuit assembly 11. Said embodiment comprises a rectifier circuit 20 which is preferably formed as a full bridge, and, in the present embodiment, two power semiconductor devices 21 which, in the present case, are designed as IGBT, as the actual switching or control elements. In this case, a larger power semiconductor device 21 can also be provided.

In FIG. 2, in addition to the actual circuit breaker device 1, the electrical surroundings are also shown. In this case, the supply network is represented by the AC/DC power supply source 16, the internal line resistor 17 and the line inductor 18. Furthermore, an electrical load 23, as well as an electrical fault 22 in the form of a short circuit, is shown.

Figure 1:
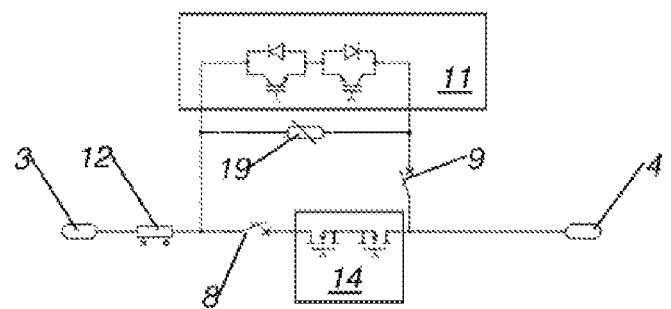
FIG. 1 is a first embodiment of a switching path of a circuit breaker device in question.

In contrast to the low-voltage circuit breaker device 1 according to FIG. 2, in the case of the low-voltage circuit breaker device 1 according to FIG. 1 only the line conductor path 2 is provided, such that the first mechanical disconnector 9 is arranged, in terms of circuit technology, in the parallel branch of the first semiconductor circuit assembly 11 and so as to be in series with the first semiconductor circuit assembly 11, i.e. simultaneously in parallel with the bypass switch 8. In this arrangement, the first mechanical disconnector 9 can be designed in a mechanically significantly simpler manner than in the case of the low-voltage circuit breaker device 1 according to FIG. 2, since current flows therethrough only during a switching process. At the same time, the bypass switch 8 is intended to be designed so as to ensure galvanic isolation, in particular having a correspondingly increased contact distance in the open state.

Furthermore, in the embodiment according to FIG. 1 the first semiconductor circuit assembly 11 is designed differently from FIG. 2. The present invention is therefore independent of the specific implementation of the first semiconductor circuit assembly 11.

In this case, it is preferable for the electronic control unit 13 to still be designed to actuate the first mechanical disconnector 9 if galvanic isolation is desired or required during a tripping process. During the operation described here, the disconnector 9 is closed.

It is likewise preferable for a second mechanical disconnector 10 to be arranged in the neutral conductor path 5, and for the electronic control unit 13 to preferably be designed to actuate the second mechanical disconnector 10. Furthermore, a surge arrestor 19, in particular a varistor, preferably an MOV, is arranged so as to be in parallel with the bypass switch 8 and the first semiconductor circuit assembly 11, and in series with the first disconnector 9, in terms of circuit technology. In this case, MOV stands for metal oxide varistor.

It is proposed for a second semiconductor circuit assembly 14 to be arranged in the line conductor path 2 so as to be in series with the bypass switch 8 and in parallel with the first semiconductor circuit assembly 11, in terms of circuit technology.

The second semiconductor circuit assembly 14 can reduce the load both of the bypass switch 8 and of the first semiconductor circuit assembly 11. As a result, it is possible for the current to be commutated to the first semiconductor circuit assembly 11 at a significantly lower current strength than in the case of conventional circuit breaker devices, as a result of which the load on the first semiconductor circuit assembly 11 can be reduced and the service life thereof can be increased. As a result, the emergence of an electric arc at the bypass switch 8 is substantially entirely prevented, as a result of which the load of the corresponding switching contacts can be reduced and the service life thereof increased.

The present measures make it possible to achieve further advantages. Since no electric arc occurs upon tripping, it is also not necessary to extinguish an electric arc. No hot ionized gases arise which would first have to be cooled in order to prevent re-ignition of an electric arc. As a result, both the loading capacity of the first semiconductor circuit assembly 11 can be reduced, and the entire tripping process can be further accelerated, since re-ignition of an electric arc currently no longer has to be feared. Alternatively, the loading capacity of the first semiconductor circuit assembly 11 can remain unchanged, and the opening speed of the bypass switch 8 can be reduced, as a result of which this can be designed more simply.

Breaking the short circuit or excess current quickly means that less energy than would otherwise be the case is stored, in the form of leakage inductance or in the line inductance, as a result of which the surge arrester 19 and the snubber 24 are protected. This can also be designed so as to be smaller, owing to further effects.

Since no switching arc occurs, the voltage drop at the first semiconductor circuit assembly 11 is not limited by the electric arc voltage.

The second semiconductor circuit assembly 14 furthermore allows for advantageous operation of the low-voltage circuit breaker device 1 that deviates entirely from the applicant's prior art according to WO 2015/028634 A1.

It is furthermore or alternatively proposed that the electronic control unit 13 should be designed such that, in the event of a current arising over the line conductor path 2 that is greater than the rated current but smaller than the trigger excess current, in particular a short circuit, said control unit initially activates the first semiconductor circuit assembly 11, then cuts off the second semiconductor circuit assembly 14, and subsequently connects the first semiconductor circuit assembly 11 and the second semiconductor circuit assembly 14 in a specifiably alternating manner, and thereby conducts the current flow in an alternating manner via the first semiconductor circuit assembly 11 and the second semiconductor circuit assembly 14. In this case, the bypass switch 8 is constantly closed. However, a current of this kind which may flow for a short time, for example upon startup of a machine or in the case of too great a load, is not a risk, but can lead to significant power loss in the circuit breaker 1. The present mode of operation makes it possible for the thermal stress of both semiconductor circuit assemblies 11, 14 to be kept low, in that the current can be switched back and forth between said two semiconductor circuit assemblies 11, 14 in a specifiably clocked manner. As a result, low power loss occurs at each of the semiconductor circuit assemblies 11, 14, the relevant currentless semiconductor circuit assembly 11, 14 furthermore having the opportunity to cool.

It is furthermore or alternatively proposed that the electronic control unit 13 should be designed such that, in the event of a trigger excess current, in particular a short circuit, arising over the line conductor path (2), said control unit initially activates the first semiconductor circuit assembly 11, subsequently cuts off the second semiconductor circuit assembly 14, subsequently opens the bypass switch 8, and subsequently controls the first semiconductor circuit assembly 11 so as to enter the non-conductive state.

In this case, it is preferable for the electronic control unit 13 to be designed such that, in the event of a short circuit current being detected by the ammeter assembly 12, said control unit initially activates the first semiconductor circuit assembly 11, subsequently cuts off the second semiconductor circuit assembly 14, substantially immediately subsequently opens the bypass switch 8, and subsequently, in particular as soon as the bypass switch 8 has opened sufficiently, controls the first semiconductor circuit assembly 11 so as to enter the non-conductive state, and subsequently, in particular as soon as the current is virtually zero, opens the first mechanical disconnector 9. Subsequently, the second mechanical disconnector 10 is preferably opened. Operation in this sequence makes it possible to achieve commutation of the current on the first semiconductor circuit assembly 11 even if said current is still very small, wherein no corresponding drop associated with an electric arc at the bypass switch 8 is required.

It is preferably possible for the second semiconductor circuit assembly 14 to be designed so as to be bidirectional. Particularly preferably the second semiconductor circuit assembly 14 is designed as a four quadrant switch, for both current directions and both voltage polarities.

It is furthermore preferably possible for the second semiconductor circuit assembly 14 to be designed comprising a low-voltage semiconductor 15. The second semiconductor circuit assembly 14 is constantly in the current flow, and therefore the internal resistance thereof is relevant for preventing high power loss at this point. Following tripping of the second semiconductor circuit assembly 14, power commutates to the first semiconductor circuit assembly 11. In this case, the voltage drop over the second semiconductor circuit assembly 14 is just a few volts. When the first semiconductor circuit assembly 11 is broken, care should be taken that the switching contacts of the bypass switch 8 have already reached a sufficient contact distance that no voltage is any longer applied to the second semiconductor circuit assembly 14.

The low-voltage semiconductors 15 are preferably selected as 20-30 V MOSFETs, owing to the very low internal resistance thereof, and in order to keep the power loss slow during normal operation. The voltage drop at the low-voltage semiconductor 15 is used merely for bringing the current, for commutation, onto the first semiconductor circuit assembly 11.

The first semiconductor circuit assembly 11 is designed so as to be correspondingly loadable, in order to switch the high currents and voltage peaks in the event of a short circuit. The first semiconductor circuit assembly 11 can be broken as soon as the contacts of the bypass switch 8 have sufficient contact distance.

The low voltage semiconductors 15 in each case preferably comprise an anti-parallel diode which is referred to as a monolithic body diode.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage circuit breaker device, comprising:
    at least one line conductor path from a line conductor supply connection of the low-voltage circuit breaker device to a line conductor load connection of the low-voltage circuit breaker device;
    a neutral conductor path from a neutral conductor connection of the low-voltage circuit breaker device to a neutral conductor load connection of the low-voltage circuit breaker device;
    a mechanical bypass switch arranged in the line conductor path;
    a first semiconductor circuit assembly of the low-voltage circuit breaker device being connected in parallel with the mechanical bypass switch;
    an electronic control unit configured to actuate the mechanical bypass switch and the first semiconductor circuit assembly;
    an ammeter assembly arranged in the line conductor path, which ammeter assembly is connected to the electronic control unit; and
    a second semiconductor circuit assembly arranged in the line conductor path so as to be in series with the mechanical bypass switch and in parallel with the first semiconductor circuit assembly, in terms of circuit technology,
    wherein the electronic control unit is configured such that:
    in event of a current arising over the line conductor path that is greater than a rated current but smaller than a trigger excess current comprising a short circuit, the electronic control unit initially completes the first semiconductor circuit assembly, then cuts off the second semiconductor circuit assembly, and subsequently and repeatedly connects the first semiconductor circuit assembly and the second semiconductor circuit assembly in a specifiably alternating manner, and thereby conducts a current flow in an alternating manner via the first semiconductor circuit assembly and the second semiconductor circuit assembly, and
    in event of a trigger excess current comprising a short circuit, arising over the line conductor path, the electronic control unit initially completes the first semiconductor circuit assembly, subsequently cuts off the second semiconductor circuit assembly, subsequently opens the mechanical bypass switch, and subsequently controls the first semiconductor circuit assembly so as to enter a non-conductive state.

2. The low-voltage circuit breaker device according to claim 1, wherein the low-voltage circuit breaker device comprises a first mechanical disconnector which is associated with the line conductor path, and
    wherein the low-voltage circuit breaker device comprises a second mechanical disconnector which is arranged in the neutral conductor path.

3. The low-voltage circuit breaker device according to claim 2, wherein the electronic control unit is configured to open the first mechanical disconnector and the second mechanical disconnector following tripping of the low-voltage circuit breaker device.

4. The low-voltage circuit breaker device according to claim 1, wherein the second semiconductor circuit assembly is configured so as to be bidirectional, the second semiconductor circuit assembly comprising a bidirectional 4-quadrant switch.

5. The low-voltage circuit breaker device according to claim 1, wherein the second semiconductor circuit assembly comprises a low-voltage semiconductor.

6. The low-voltage circuit breaker device according to claim 1, wherein the first semiconductor circuit assembly includes two power semiconductor devices arranged in parallel with each other in terms of circuit technology and configured as switching or control elements.

7. The low-voltage circuit breaker device according to claim 1, wherein during subsequent and repeated connecting of the first semiconductor circuit assembly and the second semiconductor circuit assembly in the specifiably alternating manner the bypass switch remains constantly closed.

8. The low-voltage circuit breaker device according to claim 1, wherein the first semiconductor circuit assembly and the second semiconductor assembly are configured to operate in the specifically alternating manner such that the current is switchable back and forth between the first semiconductor circuit assembly and the second semiconductor circuit assembly in a specifically clocked manner.

9. The low-voltage circuit breaker device according to claim 1, during the entirety of the event of the current arising over the line conductor path that is greater than the rated current but smaller than the trigger excess current comprising the short circuit, the electronic control unit is configured to repeatedly perform the ordered operation of: connecting the first semiconductor circuit assembly, then opening the second semiconductor circuit assembly, then connecting second semiconductor circuit assembly, and then opening the first semiconductor circuit assembly.

\* \* \* \* \*